United States Patent Office 3,285,936
Patented Nov. 15, 1966

3,285,936
PREPARATION OF SUBSTITUTED DIOXOLANES FROM PERHALOACETONE AND AN EPOXIDE
Everett E. Gilbert, Morris Township, Morris County, and Edmund J. Rumanowski, Dover, N.J., assignors to Allied Chemical Corporation, New York, N.Y., a corporation of New York
No Drawing. Filed Mar. 16, 1964, Ser. No. 352,306
6 Claims. (Cl. 260—340.9)

This invention relates to a method for the production of certain ketals by the reaction of tetrafluorodichloroacetone and an appropriate epoxide in the presence of a catalytic quantity of pyridine.

Simmons and Wiley (J. Am. Chem. Soc., 82, 2288 (1966)) have shown that ketals can be prepared from fluorochloroacetones in a two-step process, as follows:

(A)

$(F_2ClC)_2CO + HOCH_2CH_2Cl \longrightarrow (F_2ClC)_2C(OH)CH_2CH_2Cl$ (B)

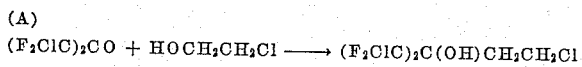

The same ketone was similarly reacted wtih trimethylene chlorohydrin and with 1,3-dichloro-2-hydroxypropane, and the hemiketals formed were then converted to the analogous ketals. Hexafluoroacetone and 1,1,1-trifluoroacetone were likewise converted to ketals using ethylene chlorohydrin. Except for the ketal made from 1,3-dichloro-2-hydroxypropane (yield 88%), the overall yields of ketals were poor—in the range of 11 to 42%.

In accordance with the present invention, it has been discovered that the ketal produced in reaction (B) above and related ketals can be prepared in a one-step process in excellent overall yields and in a high state of purity by reacting tetrafluorodichloroacetone and propylene oxide or other appropriate epoxides in the presence of a catalytic quantity of pyridine. Where propylene oxide is the epoxide utilized, the reaction which takes place when the process of this invention is carried out can be exemplified as follows:

(C)

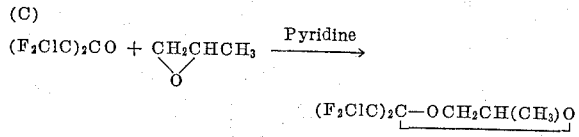

The following examples illustrate the process of the invention and are to be considered not limitative:

Example I

Tetrafluorodichloroacetone of the formula $(F_2ClC)_2CO$ (40 gms.—0.2 mole), propylene oxide (12 gms.—0.2 mole), and pyridine (15 drops—0.01 mole) were refluxed at 50 to 100° C. for 24 hours, at which time refluxing had virtually ceased. This showed that some reaction had occurred, since both reactants boil below 45° C. Vacuum distillation gave 60 gms. (77% of theory) of ketal of the formula

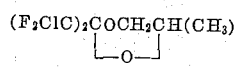

boiling from 85 to 90° C. at 40 mm. of mercury absolute pressure.

*Analysis.*—Calculated for the ketal: 28.0% C, 2.3% H, 27.6% Cl. Found: 27.5% C, 2.8% H, 27.8% Cl. Without pyridine no reaction occurred.

The same ketal was made for comparison by the literature method (Simmons and Wiley, loc. cit.) using the ketone and 1-chloro-2-hydroxypropane. A 46% yield of product was obtained; it had the same boiling point as the material above made from propylene oxide. Infrared spectrographic comparison of the two materials showed them to be identical, except that the material made by the literature procedure showed an extra carbonyl peak, indicating the presence of unreacted ketone. This was removed by re-distillation; the two spectra were then found to be identical.

Example II

Tetrafluorodichloroacetone (39.8 gms.—0.2 mole), butadiene monoepoxide of the formula

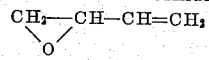

(14 gms.—0.2 mole), and pyridine (20 drops—0.012 mole) were refluxed for six hours. The pot reflux temperature began at 53° C., but gradually rose to 140° C. as reaction proceeded. Vacuum distillation gave 43 gms. of ketal of the formula

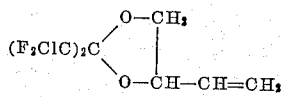

boiling at 69–71° C. at 10.5 mm. of mercury absolute pressure.

*Analysis.*—Calculated for the ketal: chlorine—26.4%; found: 26.4%. Infrared spectrographic analysis was consistent wtih the desired structure.

Various modifications can be made in the procedures of the preceding examples to provide other embodiments which fall within the scope of the present invention, as set forth in Table I. The butadiene monoepoxide used in Examples III and IV was the same as that used in Example II. In Example V, the mixed butylene oxides consisted of the epoxide of 1,2-butylene and the epoxide of 2,3-butylene. In Example VI, the mixed epoxyoctanes consisted of the epoxide of 1,2-octene and the epoxide of 2,3-octene.

In Example III, the reaction was carried out by refluxing the reaction mixture, and during the reaction period the pot temperature rose from 52° C. to 130–140° C. In Example IV, the reaction was similarly conducted. In Example V, the reaction mixture was refluxed until the pot temperature reached 120° C. In Example VI, the reaction mixture was refluxed until the pot temperature reached 135° C., and in Example VII the reaction mixture was refluxed until the pot temperature reached 130° C.

TABLE I

| Example | Epoxide Gms. | Ketone Gms. | Pyridine (Drops) | Heating Time (Hrs.) | Boiling Point °C. | Boiling Point Mm. Hg Abs. | Yield Gms. |
|---|---|---|---|---|---|---|---|
| III. Butadiene monoepoxide | 35 | 100 | 40 | 10 | 69–71 | 10.5 | 72 |
| IV. Butadiene monoepoxide | 35 | 100 | 40 | 9 | 69–71 | 10.5 | 84 |
| V. Butylene oxides (mixed) | 14.4 | 40 | 20 | 12 | 65–75 | 10 | 37 |
| VI. Epoxyoctanes (mixed) | 12.8 | 20 | 10 | 6 | 95–105 | 10 | 24 |
| VII. 1,2-epoxy-3-isopropoxypropane | 11.6 | 20 | 10 | 6.5 | 90–100 | 5 | 17 |

As is shown in Table II which follows, the general procedure of the method of this invention in which an epoxide is reacted with $(F_2ClC)_2CO$ in the presence of a catalytic quantity of pyridine can also be applied to other epoxides. In C, vinylcyclohexene mono oxide is

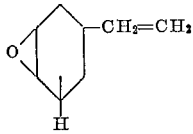

In D, vinylcyclohexene dioxide is

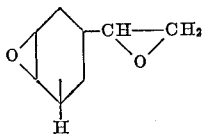

somewhat smaller amounts of pyridine are also effective. Furthermore, although in the specific examples the reaction between the tetrafluorodichloroacetone and the epoxide was carried out by refluxing the reactants, the particular reaction temperature used is not critical. Generally speaking, reaction temperatures within the range from about 25° to about 150° C. are useful.

The products produced by carrying out the process of this invention conform to the formula:

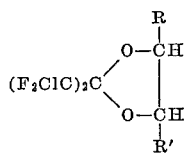

wherein R and R' have the meaning given above. When saturated, the products are extremely stable and can be

TABLE II

|  | Epoxide Gms. | Ketone Gms. | Pyridine (Drops) | Heating Time Hrs. | Yield Gms. |
|---|---|---|---|---|---|
| A. 1,2-epoxy-3-phenoxypropane | 22.5 | 30 | 15 | 9 | 46 |
| B. Cyclohexene oxide | 14.7 | 30 | 10 | 6 | 40 |
| C. Vinylcyclohexene (mono oxide) | 24.8 | 40 | 20 | 2.5 | |
| D. Vinylcyclohexene (dioxide) | 14.0 | 40 | 20 | 10.5 | 40 |
| E. 3,4-epoxycyclohexane carbonitrile | 24.6 | 40 | 20 | 6 | |
| F. 3,4-epoxy-6-methyl cyclohexylmethylacetate | 27.6 | 30 | 20 | 2.5 | |

Various modifications can be made in the procedure of the specific examples to provide other embodiments which fall within the scope of the present invention. With respect to the reactants used, one of them must be $$(F_2ClC)_2CO$$

The other reactant must be an appropriate epoxide. In place of the propylene oxide, mixed butylene oxides and mixed epoxyoctanes in the specific examples, there can be substituted other alkylene mono-epoxides containing from 2 to 8 carbon atoms in either pure or mixed form, for example, ethylene oxide. Also, in place of the 1,2-epoxy-3-isopropoxypropane utilized in Example VII, there can be substituted other 1,2-epoxy-3-alkoxypropanes containing from 1 to 3 carbon atoms in the alkoxy group, for example, 1,2-epoxy-3-methoxypropane or 1,2-epoxy-3-ethoxypropane. Generally speaking, the epoxides utilized as a reactant in accordance with the process of this invention conform to the formula

wherein R can be a hydrogen atom or an alkyl radical containing from one to six carbon atoms and R' can be a hydrogen atom, an alkyl radical containing from one to six carbon atoms, the vinyl radical or an alkoxy radical containing from one to three carbon atoms, with the provisos that when R and R' are alkyl the sum of the number of carbon atoms in R plus the sum of the number of carbon atoms in R' is from two to six; when R' is vinyl, R must be hydrogen; and when R' is alkoxy, R must be hydrogen.

The relative amounts of tetrafluorodichloroacetone and epoxide introduced into the reaction mixture are not critical. The specific examples illustrate that good yields of the desired products can be obtained when equimolar proportions of the reactants are introduced into the reaction mixture.

As is illustrated by the procedures of Examples II, III, and IV, the amount of pyridine introduced into the reaction mixture as a catalyst for the purpose of aiding the reaction can also be varied. Generally speaking, the amount of pyridine used as a catalyst will be within the range from about 0.001 to about 0.1 mole per mole of tetrafluorodichloroacetone, but somewhat larger and also used as heat transfer media. Also when saturated, the products can be reacted with polyesters of four to six carbon atom monoethylenic unsaturated polycarboxylic acids (e.g., dimethylmaleate, diethylmaleate and so forth) in the presence of free-radical-promoting agents (e.g., acetyl peroxide, tertiary-butyl peroxide and so forth) to provide telomeric compositions useful as lubricants, lubricant additives, softeners for synthetic rubber, wax composition additives and anti-foam agents. When unsaturated, the products produced by practicing the method of this invention can be polymerized in the manner of ethylenic compounds to produce polymers which can be used as surface coatings and for other purposes.

The embodiments of the invention in which an exclusive property or privilege is claimed are defined as follows:

1. A method for the production of a ketal of the formula

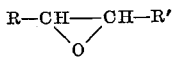

which comprises reacting $(F_2ClC)_2CO$ and an epoxide of the class $$R-CH\underset{O}{-}CH-R'$$

in the presence of a catalytic amount of pyridine, R being selected from the group consisting of hydrogen and alkyl radicals containing from one to six carbon atoms and R' being selected from the group consisting of hydrogen, alkyl radicals containing from one to six carbon atoms, vinyl and alkoxy radicals containing from one to three carbon atoms, with the provisos that when R and R' are both alkyl the sum of the number of carbon atoms in R plus the sum of the number of carbon atoms in R' is from two to six, that when R' is vinyl R is hydrogen and that when R' is alkoxy R is hydrogen.

2. The method of claim 1 wherein the amount of pyridine is from 0.001 to 0.1 mole per mole of $$(F_2ClC)_2CO$$

3. The method of claim 1 wherein R is hydrogen and wherein R′ is methyl.

4. The method of claim 1 wherein R is hydrogen and wherein R′ is vinyl.

5. The method of claim 1 wherein R is hydrogen and wherein R′ is ethyl.

6. The method of claim 1 wherein R is hydrogen and wherein R′ is isopropoxy.

No references cited.

ALEX MAZEL, *Primary Examiner.*

JAMES H. TURNIPSEED, *Assistant Examiner.*